United States Patent Office 3,009,921
Patented Nov. 21, 1961

3,009,921
PRODUCTION OF SYMMETRICALLY SUBSTITUTED CONJUGATED HEXATRIENES AND THEIR VINYLOGUES
Walter Stilz, Heidelberg, and Horst Pommer, Ludwigshafen (Rhine), Germany, assignors to Badische Anilin- & Soda-Fabrik Aktiengesellschaft, Ludwigshafen (Rhine), Germany
No Drawing. Filed Sept. 30, 1959, Ser. No. 843,356
Claims priority, application Germany Oct. 2, 1958
7 Claims. (Cl. 260—340.5)

This invention relates to an improved process for the production of conjugated hexatrienes and their vinylogues.

Symmetrically substituted hexatrienes, and especially their vinylogous compounds, play an important part in chemistry, medicine and in human and animal nutrition. Important natural substances, for example lycopene, beta-carotene, zeaxanthin, crocetins and bixins, belong to this class. Moreover similarly constituted polyenes are gaining an increasing importance as non-toxic dyestuffs with bioaffinity for foods and feeding stuffs. A large number of important intermediate products for the synthesis of medicaments, plastics and dyestuffs may also be classified in this class of substances.

The synthesis of substances of the said kind has been the aim of numerous works. A common feature of almost all prior methods has been that secondary or tertiary alcohols have first been synthesized with the more or less unsaturated carbon framework of the above mentioned class of compounds and these have then been subjected to a reaction for splitting off water. In some methods there are first obtained compounds having one or more triple linkages which have been hydrogenated to double linkages with the aid of special catalysts; in other cases further double linkages must be introduced. Common to almost all prior methods is also the use of organo metallic reactions which are difficult to control on a technical scale, such as Grignard's reaction or that according to Reformatzki. By reason of the sensitivity of the end products and of the alcohols occurring as intermediate products, the yields are as a rule not very satisfactory (see for example the comprehensive description of H. H. Inhoffen and H. Siemer in "Fortschritte der Chemie organischer Naturstoffe," 1952, page 1 et seq. and, inter alia, German patent specifications 818,942, 818,943, 850,745, 857,963, U.S. patent specification 2,671,112 and British patent specification 783,389, and also O. Isler and collaborators in "Zeitschrift für angewandte Chemie," No. 68 (1956), pages 547 to 553, in Helv. chim. Acta 39 (1956), page 249, and in Chimia 12 (1958), pages 1 to 42).

It is also known that it is possible to obtain conjugated hexatrienes from dihydromuconic acid esters either by reacting them with aryl lithiums and dehydrating the diols formed (G. Wittig, Berichte der deutschen chemischen Gesellschaft, 69 (1936), page 2087), or by reacting them with carbonyl compounds in the presence of lead oxide after the nature of a Stobbe condensation, and decarboxylation of the dicarboxylic acids formed by saponification (R. Kuhn, Helv. chim. Acta, 11 (1928), page 116). These reactions as a rule give only modest yields and are not generally successful. For example the natural compounds mentioned above cannot be prepared in this way.

They first became better accessible by the reaction of phosphorus ylides with suitable oxo compounds (see for example German patent specification No. 971,986). Although this process represents an advance, it is still not entirely satisfactory as regards general applicability and yields. The separation of the triaryl phosphine oxide formed as byproduct also often offers difficulty.

It is an object of the present invention to provide a specially advantageous process which is generally applicable to the production of hexatrienes and their vinylogues. A further object is to obtain the desired compounds in good yields by a process which is easy to carry out, and in which the desired products can be easily isolated from the reaction mixture, so that the process is also suitable to be carried out technically on a large scale.

We have now found that the said objects can be achieved and symmetrically substituted conjugated hexatrienes and their vinylogous compounds obtained in good yields and excellent purity by reacting a compound of the general formula:

(A)
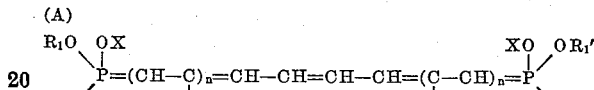

or (B)
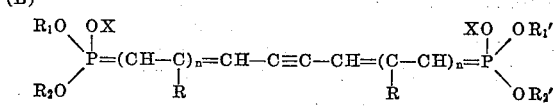

in which $n$ represents zero or 1 or 2, X a cation, R a hydrogen atom, an alkyl, cycloalkyl, aralkyl or aryl radical, and each of $R_1$, $R_2$, $R_1'$ and $R_2'$ represents hydrogen or an alkyl group, especially one with 1 to 4 carbon atoms, with a saturated or unsaturated compound containing an oxo group and, when the initial material is a compound of the formula B, selectively hydrogenating the acetylene linkage to a double linkage.

Especially preferred compounds of the Formulae A and B are those in which R represents a hydrogen atom or an alkyl radical, especially a lower alkyl radical with 1 to 4 carbon atoms, $R_1$, $R_2$, $R_1'$ and $R_2'$ methyl, ethyl, propyl or butyl and X an alkali metal cation or an equivalent of an alkaline earth metal cation.

The hitherto unknown initial materials of the type A and B can be prepared in a simple way by reaction of a compound of the general formula (C) Y—H$_2$C—(C=CH)$_n$—CH=CH—(CH=C)$_n$—CH$_2$Y
                |                            |
                R    1   1'       R or a 1.1'-dehydro derivative of the same (D) with a phosphorous acid ester of the general formula (E)
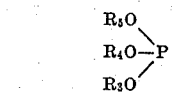

and subsequent reaction of the diphosphonic acid ester thus obtained with a proton acceptor. In the Formulae C and E, Y represents halogen, especially bromine and chlorine, or the O-tosyl radical:

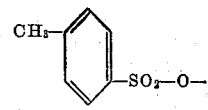

$n$ and R, have the same meaning as in the Formulae A and B while $R_3$, $R_4$ and $R_5$ each represents an alkyl group, especially with 1 to 4 carbon atoms.

If it is desired to start with compounds of the Formulae

A or B in which $R_1$, $R_2$, $R_1'$ and $R_2'$ stand for hydrogen, the substances are obtained by saponifying in the usual way diphosphonic acid esters of the formula (A₁)

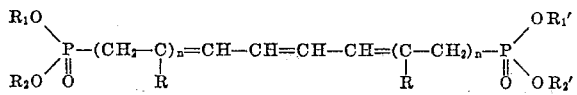

or (B₁)

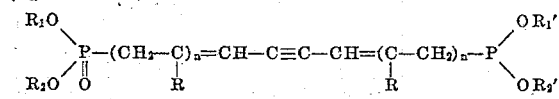

obtainable by reaction of the compounds C and D with a phosphorous acid ester E. The saponification can be achieved e.g. by treating with diluted aqueous acids.

Suitable proton acceptors for the production of the initial materials are as a rule organic and inorganic bases, as for example alkali and alkaline earth hydroxides, alkali and alkaline earth alcoholates, such as sodium methylate, sodium ethylate, sodium isopropylate, magnesium ethylate and potassium tertiary butylate, alkali and alkaline earth amides, as for example sodamide and calcium amide, strongly basic amines, such as diethylamine or dibutylamine, and basic ion exchange resins. Examples of ion exchange resins are the condensation products built up on the basis of formaldehyde and alkylene polyamines. Ion exchangers which are obtained in known manner by introducing halogenalkyl groups into polyvinyl compounds, such as polystyrene, and subsequent reaction with a tertiary amine, are also suitable. Basic ion exchange resins of the said kinds are available for example under the registered trademark Lewatit, Dowex and Amberlite.

Compounds containing in the molecule an oxo group are hereinafter briefly called oxo compounds. They may contain one oxo group or more, e.g., two oxo groups. Those oxo compounds suitable for use as reactants in the process according to this invention are compounds which contain in the molecule at least one carbonyl group and in which the free valencies of the carbonyl group $O=C<$ are saturated either both by an organic radical or one by a hydrogen atom and the other by an organic radical which may be saturated or unsaturated. The oxo compounds are therefore aldehydes and ketones. They may be saturated or unsaturated and contain up to about 20 carbon atoms.

Among the numerous compounds containing oxo groups which are suitable for the reaction there may be given as examples: formaldehyde, acetaldehyde, acetone, methoxyacetone, methylglyoxal acetal, hydroxyacetone (acetol), glyoxylic acid esters, glycol aldehyde, glycol aldehyde acetate, the ethers of glycol aldehyde, crotonaldehyde, tiglic aldehyde, vinyl methyl ketone, sorbic aldehyde, benzaldehyde, cinnamaldehyde, fluorenone, 2,6-dichlorbenzaldehyde, Michler's ketone, phenyl pentadienal, 2,6,9 - trimethyl - pentadecapentaene-(2,6,8,10,12)-one-(14), 8-(2',6',6' - trimethylcyclohexene - (1')-yl-(1'))-6-methyloctatriene-(3,5,7)-one-(2), 8-(2',6',6'-trimethyl-cyclohexadiene - (1',3')-yl-(1'))-6-methyloctatriene-(3,5,7)-one-(2), 8-(2',6',6' - trimethyl-4-acetoxy-cyclohexene-(1')-yl-(1'))-6-methyloctatriene-(3,5,7,) - one-(2), 1,1 - dialkoxy-2-methylheptadiene-(2,4)-one-(6), and also beta-formylcrotonic acid, beta-acetylacrylic acid, delta-formylsorbic acid, 3-methyl-7-formyl-octatriene-(2,4,6)-acid, 2-methyl - 5-acetylpentadiene-(2,4)-acid, 4-methyl-7-acetylheptatriene-(2,4,6)-acid and the esters of these acids.

It is preferable to carry out both the reaction for the formation of the starting compounds of the Formulae A and B and the condensation reaction in a solvent which is practically inert to the proton acceptor which yields the cation X. Examples of such solvents are hydrocarbons, such as xylene, alcohols, such as methanol, ethanol, isopropanol, butanol, glycol, hexanol, cyclohexanol, and cyclo-octanol, and also ethers, such as di-isopropyl ether, tetrahydrofurane, dimethyltetrahydrofurane and dioxane. The reactions according to this invention also proceed in aqueous medium. Polar organic solvents, such as formamide, dimethylformamide, dimethyl sulfoxide, and N-methylpyrrolidone are especially suitable.

For the production of the initial materials in a manner known in principle, a compound of the general Formula C is heated with at least a stoichiometrical amount of the phosphorous acid ester, for example triethyl phosphite, to temperatures which lie as a rule between 50° and 200° C. It is advantageous to continue heating until 2 mols of ethyl chloride have escaped. The crude product may if desired or necessary be purified by distillation under reduced pressure but in many cases the crude product may be directly used. If desired it is dissolved in preferably 1 to 10 times the amount of a suitable solvent of the said kind and the proton acceptor added at least in the stoichiometrical amount, i.e., at least 2 mols of an acceptor containing a monovalent cation for each mol of diphosphonic acid ester. An excess is as a rule innocuous and in many cases even advantageous. In this way there is obtained a solution or suspension of the initial compound of the Formula A or B. To this there is then added the oxo compound, possibly also dissolved in a solvent of the said kind, and the claimed condensation then usually proceeds very rapidly, as a rule with strong evolution of heat. The condensation may be carried out within a wide temperature range. It is advantageous to work between about 0° and about +100° C., especially between about 10° and about 80° C. When reacting sensitive components, it is preferable to work in an atmosphere of an inert gas, as for example nitrogen or argon. The oxo compounds are used for the condensation in about the calculated amount, i.e. about 2 mols for each mol of the compound of the Formula A or B. More or less may however be used, as for example about 5 to 30% by weight more than the amount theoretically necessary.

The last step of the production of the actual initial materials of the Formula A or B, i.e. the reaction of the diphosphonic acid ester with the proton acceptor to form the compounds of the Formula A or B, can also be combined with the said condensation, for example by adding a solution of the diphosphonic acid ester and the oxo compound to a solution of a proton acceptor. In this case there then takes place the reaction of the oxo compound with the compound of the Formula A or B which is formed in situ.

The polyenes formed by the condensation according to the invention often crystallize out when the reaction mixture is cooled. In other cases it is suitable to dilute the mixture with a suitable solvent, such as methanol, ethanol or water, and to separate the polyenes. The advantage as compared with the ylide process resides especially in the ready accessibility of the initial materials and the extremely convenient separability of phosphorus containing byproducts which are water soluble. A further advantage lies in the general applicability of the new process, in the relatively high yields, in the purity of the end product and in the complete insensitivity to water of the condensation process.

The compounds obtainable according to this invention are capable of use as intermediate products, as pharmaceutical products and some of them as provitamin-A-active dyestuffs for foods and feeding stuffs.

The following examples will further illustrate this invention but the invention is not restricted to these examples. The parts are by weight unless otherwise specified. Parts by weight bear the same relation to parts by volume as the gram to the cc. under normal conditions.

*Example 1*

40 parts of triethyl phosphite are heated to 130° to 150° C. in a three necked flask connected by way of a column to a descending condenser and provided with an internal thermometer and a dropping funnel. A mixture of 60 parts of 1,8-dibrom-2,7-dimethyl-octadiene-(2,6)-ine-(4) and 40 parts of triethyl phosphite is gradually dripped in. The ethyl bromide formed is distilled off through the column and collected in an ice cooled receiver. The reaction material is gradually heated to an internal temperature of 180° C. After cooling, the remaining low boiling constituents are removed in a high vacuum. There remain 81 parts of crude 2,7-dimethyl-octadiene - (2,6) - ine-(4)-diphosphonic acid-(1,8)-tetraethyl ester as a yellow brown oil which is preferably worked up further as the crude product.

A mixture of 25 parts of the crude 2,7-dimethyl-octadiene (2,6) - ine - (4)-diphosphonic acid-(1,8) tetraethyl ester, 25 parts of cinnamaldehyde and 50 parts by volume of dimethylformamide are allowed to drip into a mixture of 39 parts by volume of 30% sodium methylate solution and 150 parts by volume of dimethylformamide while stirring vigorously at 30° to 40° C. The reaction mixture immediately becomes red brown in color and even after a short time quince yellow lustrous leaflets begin to precipitate. The reaction mixture is stirred for another half an hour, adjusted to pH 7 with glacial acetic acid and diluted with 100 parts by volume of methanol. The precipitated crystals are filtered off by suction and recrystallized from benzene. 5.64 parts of 1,14-diphenyl - 5,10 - dimethyl-tetradecahexaene-(1,3,5,9,11,13)-ine-(7) are obtained in the form of golden yellow leaflets of the melting point 234° to 236° C.

By partial hydrogenation of the triple linkage in the 1,14-diphenyl - 5,10 - dimethyl-tetradecahexaene-(1,3,5,9,11,13)-ine-(7) in the usual way, 1,14-diphenyl-5,10-dimethyl-tetradecaheptaene-(1,3,5,7,9,11,13) is obtained. The hydrogenation proceeds almost quantitatively.

*Example 2*

A mixture of 18 parts of 30% sodium methylate solution and 20 parts by volume of dimethylformamide is dripped into a mixture of 20 parts of crude 2,7-dimethyl-octadiene - (2,6)-ine-(4)-tetraethyl-diphosphonate-(1,8), 16 parts of benzaldehyde and 50 parts by volume of dimethylformamide while stirring vigorously at about 0° C., in such a way that the reaction temperature does not rise above +5° C. Already after a few minutes, yellow leaflets separate out from the red brown reaction material. After the end of the addition, stirring is continued for another half an hour, the pH then adjusted to 7 with glacial acetic acid and 100 parts by volume of methanol added to the mixture. The deposited crystals are filtered off by suction.

After recrystallization from benzene there are obtained 8.5 parts of 1,10-diphenyl-3,8-dimethyl-decatetraene-(1,3,7,9)-ine(5) in the form of lustrous yellow leaflets of the melting point 221° to 222° C.

By partial hydrogenation of the triple linkage in the usual way, there is obtained 1,10-diphenyl-3,8-dimethyl-decapentaene-(1,3,5,7,9) as orange red leaflets of the melting point 215° to 217° C. ($\lambda_{max}$:383, 404, 429 millimicrons, measured in cyclohexane).

*Example 3*

41 parts of crude 2,7-dimethyloctadiene-(2,6)-ine-(4)-tetraethyldiphosphonate-(1,8) and 50 parts by volume of dimethylformamide are placed in a stirring flask in a nitrogen atmosphere. There are then dripped in simultaneously while stirring vigorously (a) a mixture of 37 parts of 30% sodium methylate solution and 20 parts by volume of dimethylformamide and (b) a mixture of 56 parts of beta-formylcrotonic acid ethyl ester and 20 parts by volume of dimethylformamide at such a speed that the temperature is between 40° and 50° C. Already after a few minutes, orange colored crystals separate out from the dark reaction mixture. The whole is further stirred for half an hour, then adjusted to pH 7 with glacial acetic acid and then 100 parts by volume of methanol are added. 5.1 parts of 1,14-bis-carbethoxy - 2,5,10,13 - tetramethyltetradecahexaene-(1,3,5,9,11,13)-ine-(7) (dehydro isocrocetin) are obtained which crystallizes from tetrahydrofurane in small orange-red parallelepipeds of the melting point 204° to 206° C.

By hydrogenation of the triple linkage in the usual way, 1,14-bis-carbethoxy - 2,5,10,13 - tetramethyl - tetradecaheptaene-(1,3,5,7,9,11,13) (also known shortly as isocrocetin) is obtained. The product obtained, after recrystallization from tetrahydrofurane, occurs in orange colored crystals. After recrystallization it has a melting point of 201° to 203° C.

*Example 4*

620 parts of triethyl phosphite are heated to 110° to 130° C. in a three-necked flask which is connected by way of a column to a descending condenser and is provided with an internal thermometer and a dropping funnel. A solution of 374 parts of 1,4-dibrom-butene-(2) in a little benzene is gradually added. The ethyl bromide formed immediately distils off through the column. The mixture is slowly heated to 170° to 190° C., kept for half an hour at this temperature and then rectified in a high vacuum. In this way there are obtained 447 parts of butene-(2)-diphosphonic acid-(1,4)-tetraethyl ester of the boiling point 162° to 168° C. at 0.3 mm. Hg ($n_D^{20}$ 1.4588).

A mixture of 40 parts of 30% sodium methylate solution and 30 parts by volume of dimethylformamide is dripped while stirring vigorously into a mixture of 32 parts of butene-(2)-diphosphonic acid tetraethyl ester-(1,4), 25 parts of benzaldehyde and 50 parts by volume of dimethylformamide at such a rate that the reaction temperature remains between 40° and 50° C. Already after a few minutes, yellowish leaflets crystallize out from the brownish solution. The mixture is stirred for another hour, then adjusted to pH 7 with glacial acetic acid and diluted with 150 parts by volume of methanol. The crystals deposited are filtered off by suction and recrystallized from ethyl acetate. There are thus obtained 6.3 parts of 1,6-diphenyl-hexatriene-(1,3,5) as lustrous yellowish leaflets of the melting point 204° to 206° C.

*Example 5*

Into a mixture of 53 parts of butene-(2)-diphosphonic acid-(1,4)-tetraethyl ester and 50 parts by volume of dimethylformamide there are allowed to drip simultaneously while stirring at 50° C. (a) a mixture of 88 parts of methyl glyoxal diethyl acetal and 50 parts by volume of dimethylformamide and (b) a mixture of 72 parts of 30% sodium methylate solution in methanol and 50 parts by volume of dimethylformamide.

The whole is further stirred for an hour, acidified with 10% sulfuric acid and diluted with an equal volume of water. After a few minutes there crystallize out from the orange-brown solution 14.7 parts of 2,7-dimethyl-octatriene-(2,4,6)-dial-(1,8) in yellowish long needles which without further purification melt at between 158° and 160° C.

*Example 6*

50 parts of fluorenone are dissolved in 70 parts by volume of dimethylformamide and then 33 parts of butene-(2)-tetraethyl-diphosphonate-(1,4) added to the solution. Then, while stirring vigorously, a mixture of 40 parts of 30% sodium methylate solution and 30 parts of dimethylformamide are dripped in at such a rate that the reaction temperature does not rise above 50° C. The solution becomes dark red in color. After a few minutes, dark red needles are deposited. The reaction mixture is stirred for another half an hour, then adjusted to pH 7 with glacial acetic acid and the crystal pulp filtered off by suction. By recrystallization from dimethyl formamide, 20 parts of di-biphenylene hexatriene are obtained in the form of beautiful red needles of the melting point 330° to 332° C.

Example 7

55 parts of 2,6-dichlorbenzaldehyde are dissolved in 100 parts of dimethylformamide and 50 parts of butene-(2)-tetraethyl-diphosphonate-(1,4) are added to the solution. A mixture of 60 parts of 30% sodium methylate solution and 30 parts by volume of dimethylformamide is dripped in so that the reaction temperature does not rise above 50° C. After stirring for another hour, it is neutralized with glacial acetic acid and the deposited crystals are filtered off by suction. By recrystallization from benzene there are obtained 14 parts of 1,6-bis-(2',6'-dichlorphenyl)-hexatriene-(1,3,5) as greenish yellow felted needles of the melting point 230° to 231° C.

Example 8

550 parts of tributyl phosphite are heated to 110° to 130° C. in a three-necked flask which is connected through a column to a descending condenser and is provided with an internal thermometer and a dropping funnel. A solution of 216 parts of 1,4-dibrom-butene-(2) in a little benzene is added a little at a time. The butyl bromide formed distils off immediately through the column. The mixture is slowly heated to 170° to 190° C., kept at this temperature for half an hour and then freed from low boiling constituents in a high vacuum. Crude butene-(2)-diphosphonic acid-(1,4)-tetrabutyl ester remains in the residue; it is taken up in 500 parts by volume of N-methylpyrrolidone and 200 parts of cyclohexanone are added. Into this mixture there are dripped with vigorous stirring at about 50° C., 500 parts of 30% potassium methylate solution. When all has been added, the whole is stirred for another hour, poured into 2000 parts by volume of water, adjusted to pH 7 with glacial acetic acid and extracted with petroleum ether. The extract is washed, dried and then concentrated. The residue is rectified in a high vacuum. At 0.1 mm. Hg there pass over at 123° C., 36 parts of 1,4-bis-cyclohexylidene-butene-(2) as a yellowish oil ($\lambda_{max}$ in cyclohexane 275, 287 and 300 millimicrons).

Example 9

15 parts of sodamide in suspension in benzene are added a little at a time at 60° to 70° C. to a mixture of 53 parts of butene-(2)-diphosphonic acid-(1,4)-tetraethyl ester, 80 parts of methylglyoxal dimethyl acetal and 150 parts by volume of absolute benzene. When all the alkali has been added the whole is stirred for another hour at 60° C., then acidified with 10% sulfuric acid and stirred for 5 hours at 60° C. The reaction product is extracted several times with benzene, the benzene solution washed, dried and concentrated. The residue is recrystallized from methanol.

17 parts of 2,7-dimethyl-octatriene-(2,4,6)-dial-(1,8) are thus obtained in yellowish long needles which melt at 158° to 160° C.

Example 10

27.0 parts of trimethyl phosphite are heated to 110° to 130° C. in a three-necked flask which is connected through a column to a descending condenser and is provided with an internal thermometer and a dropping funnel. A solution of 21.6 parts of 1,4-dibrombutene-(2) in a little benzene is added gradually. The methyl bromide formed distils off immediately through the column. The mixture is slowly heated to 170° to 190° C., held at this temperature for half an hour and then freed from low boiling constituents in a high vacuum.

The residue, crude butene-(2)-diphosphonic acid-(1,4)-tetramethyl ester, is taken up in 30 parts by volume of dimethyl sulfoxide. At room temperature there is then added a solution of 30 parts of piperonal in 30 parts of dimethyl sulfoxide and then with vigorous stirring a solution of potassium tertiary butylate (prepared by boiling 10 parts of potassium with 250 parts by volume of absolute tertiary butanol) is dripped in. After 1 hour, it is diluted with 100 parts by volume of methanol, adjusted to pH 7 with glacial acetic acid and water is added until the 1,6-bis-piperonyl-hexatriene has crystallized out. The product can be recrystallized from dimethylformamide. In this way 6 parts of 1,6-bis-piperonyl-hexatriene are obtained as green-yellow crystals which melt at 248° to 250° C.

Example 11

A solution of 9 parts of lithium hydroxide in the amount of methanol necessary to dissolve it is dripped at 50° to 60° C. into a mixture of 53 parts of butene-(2)-diphosphonic acid-1,4-tetraethyl ester, 88 parts of methylglyoxal diethylacetal, 30 parts by volume of dimethylformamide and 20 parts by volume of methanol. After the alkali has been added, the whole is stirred for 5 hours at 40° C. It is then acidified with 10% sulfuric acid, diluted with an equal volume of water and stirred for another 5 hours at 40° C. 2.5 parts of 2,7-dimethyl-octatriene-(2,4,6)-dial-(1,8) are obtained in yellowish long needles which, after recrystallization from methanol, melt at 158° to 160° C.

Example 12

460 parts of tri-isopropyl phosphite are heated to 110° to 130° C. in a three-necked flask connected by way of a column to a descending condenser and provided with an internal thermometer and a dropping funnel. A solution of 216 parts of 1,4-dibrombutene-(2) in a little benzene is slowly added. Volatile reaction products immediately distil off through the column. The mixture is slowly heated to 170° to 190° C., kept at this temperature for half an hour and then freed from low boiling constituents in a high vacuum. The residue, crude butene-(2)-diphosphonic acid-(1,4)-tetra-isopropyl ester, is taken up in 500 parts by volume of dimethylformamide; at about 45° C. there are then added 230 parts of benzaldehyde and then, while stirring, 130 parts of magnesium alcoholate. It is then stirred for 5 hours, diluted with 500 parts by volume of methanol and adjusted to pH 7 with glacial acetic acid. Water is added to the mixture until the 1,6-diphenyl-hexatriene begins to crystallize out. It is then filtered off by suction, washed with water and recrystallized from xylene.

19 parts of 1,6-diphenyl-hexatriene are thus obtained as yellow leaflets which melt at 204° to 206° C.

Example 13

33 parts of butene-(2)-diphosphonic acid-(1,4)-tetraethyl ester and 35 parts of benzal-acetone are dissolved in 100 parts by volume of dimethyl formamide. 40 parts of 30% sodium methylate solution in methanol are dripped into this mixture at 100° C. with powerful stirring. Already after a few minutes, brown-red leaflets are deposited. After the addition of alkali has been completed, the whole is stirred for another hour, diluted with 100 parts by volume of methanol and adjusted to pH 7 with glacial acetic acid. The reaction product is filtered off by suction, washed with methanol and recrystallized from xylene. There are thus obtained 14 parts of 1,10-diphenyl-3,8-dimethyl-decapentaene-(1,3,5,7,9) as orange-red leaflets which melt at 215° to 217° C.

We claim:

1. In a process for the production of symmetrically substituted conjugated hexatrienes and vinylogous compounds thereof, the improvement which comprises reacting between about 0° C. and 100° C. a compound selected from the group consisting of compounds of the formulae (A)

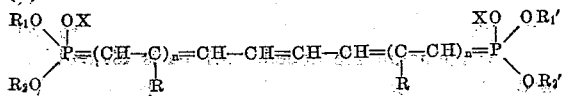

and (B) 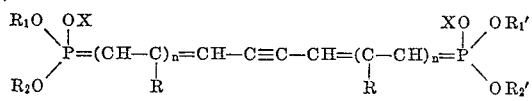

in which $n$ represents in integer of from 0 to 2, inclusive, X represents a cation selected from the group consisting of alkali metal and alkaline earth metal cations, R represents a substituent selected from the group consisting of hydrogen and alkyl with 1 to 4 carbon atoms, and each of $R_1$, $R_2$, $R_1'$ and $R_2'$ represents a substituent selected from the group consisting of hydrogen and alkyl radicals, with an oxo compound selected from the group consisting of aldehydes and ketones.

2. The process as claimed in claim 1 wherein the reaction is carried out in a polar solvent.

3. The process as claimed in claim 1 wherein the reaction is carried out in an atmosphere of an inert gas.

4. The process as claimed in claim 1 wherein the starting material selected from the group consisting of compounds of the Formulae A and B are formed in situ by reacting a member selected from the group consisting of compounds of the formulae (A₁) 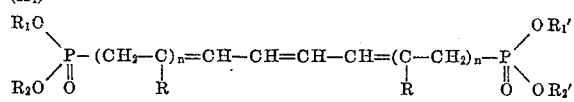

and (B₁) 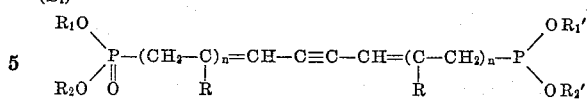

wherein R, $R_1$, $R_2$, $R_1'$, $R_2'$ and $n$ have the same meaning as in claim 1 with a proton acceptor in the presence of the oxo compound.

5. The process as claimed in claim 1 wherein the reaction is carried out in a solvent selected from the group consisting of formamide, dimethylformamide, N-methylpyrrolidone and dimethyl sulfoxide.

6. The process as claimed in claim 1 wherein reaction is carried out at a temperature between about 10° C. and 80° C.

7. The process as claimed in claim 4 wherein the proton acceptor is a member selected from the group consisting of organic and inorganic bases.

References Cited in the file of this patent
UNITED STATES PATENTS 2,770,610     Hardy et al.  ----------- Nov. 13, 1956

OTHER REFERENCES

Kosolapoff: Organophosphorus Compounds, pages 196–197 and pages 361–362 (1950).